(12) United States Patent
Filion et al.

(10) Patent No.: US 6,475,425 B1
(45) Date of Patent: Nov. 5, 2002

(54) METHOD OF MAKING A PLASTIC CONTAINER WITH INTEGRAL CHANNEL

(75) Inventors: François Filion, Canton Magog (CA); Sylvain Simard, Rock Forest (CA); Omar Khennache, Sherbrooke (CA)

(73) Assignee: Camoplast Inc., Quebec (CA)

( * ) Notice: Subject to any disclaimer, the term of this patent is extended or adjusted under 35 U.S.C. 154(b) by 0 days.

(21) Appl. No.: 09/535,864

(22) Filed: Mar. 27, 2000

(30) Foreign Application Priority Data

Mar. 31, 1999 (CA) .............................................. 2267640

(51) Int. Cl.⁷ .............................................. B29D 22/00
(52) U.S. Cl. ........................ 264/570; 264/572; 264/152; 264/154
(58) Field of Search ................................. 264/572, 570, 264/152, 154

(56) References Cited

U.S. PATENT DOCUMENTS

| | | |
|---|---|---|
| 3,993,094 A | 11/1976 | Spooner |
| 4,210,176 A | 7/1980 | Emming |
| 4,431,027 A | 2/1984 | Sabina, Jr. |
| 4,527,709 A | 7/1985 | Kondo et al. |
| 4,723,596 A | 2/1988 | Spindelboeck et al. |
| 5,111,776 A | 5/1992 | Matsushiro et al. |
| 5,329,889 A | 7/1994 | Caldwell |
| 5,456,218 A | 10/1995 | Theorell |
| 5,680,833 A | 10/1997 | Smith |
| 5,722,559 A | 3/1998 | Branham |
| 5,788,899 A | 8/1998 | Branham |
| 5,794,805 A | 8/1998 | Branham |
| 6,024,911 A | * 2/2000 | Brauner ...................... 264/572 |

* cited by examiner

*Primary Examiner*—Suzanne E. McDowell
(74) *Attorney, Agent, or Firm*—Merchant & Gould P.C.

(57) ABSTRACT

A method of making plastic containers having walls with fluid circulatable channels integrally formed therein comprises the successive steps of injecting a molten thermoplastic material in a mold cavity having a channel configuration to define, in the container being mold, walls with thicker portions defining a rib configuration, injecting a pressurized fluid throughout the rib configuration to displace molten material therein and to form a hollow channel therein, cooling the container being mold removing the molded container from the mold and cutting through the hollow channel at two spaced locations to form inlet and outlet openings to the channel to thereby enable circulation of a fluid through the channel.

10 Claims, 5 Drawing Sheets

METHOD OF MAKING A PLASTIC CONTAINER WITH INTEGRAL CHANNEL

FIELD OF THE INVENTION

The present invention relates to plastic injection molding and, more particularly, to plastic injection molding wherein a container has a hollow channel integrally formed to its walls.

BACKGROUND OF THE INVENTION

Some plastic containers are formed with an inlet orifice and an outlet orifice so that a fluid can circulate to and from the container thus allowing recirculation of the fluid to or from an external device. An example of such plastic containers is the cooling water reservoir used in the cooling system of an internal combustion engine; this cooling water reservoir is used not only for storing an overflow of cooling water but also for insuring a recirculation of a part of the cooling water to the reservoir to thereby separate and remove air and vapor from the cooling water in the reservoir. Such reservoir is formed with inlet and outlet ports each adapted to receive the connection of a hose or a tube. One such tank may be found described in U.S. Pat. No. 5,111,776 issued May 12, 1992 to Matsushiro et al.

The space available to locate a reservoir tank under the hood of a vehicle is very restricted and the presence of these hoses is often encumbering.

In a degas tank such as described in U.S. Pat. No. 5,329,889 issued Jul. 19, 1994 to Caldwell, there is shown a container having inlet and outlet ports to which is connected a series of tubes for connection to a combustion engine and a radiator. Evidently, the presence of these tubes take up an important part of the space available under the hood of a vehicle wherein many devices are lodged.

OBJECTS AND STATEMENT OF THE INVENTION

It is an object of the present invention to provide a container made of plastic material which has, integrally formed to its walls, one or more channels allowing the circulation of a fluid.

The present invention is therefore concerned with providing a plastic container wherein a channel is formed integrally with the walls of the container. The channel may extend along the outer wall of the container, or along its inner wall, or along both the inner and outer walls. Once this channel is formed, extremities thereof are cut through so that a fluid may circulate throughout.

The present invention therefore relates also to a method of making such plastic containers having walls with fluid circulatable channels integrally formed therein. The method comprises broadly the successive steps of:

injecting a molten thermoplastic material in a mold cavity having a channel configuration to define, in a container part being molded, walls with thicker portions that define a rib configuration;

injecting a pressurized fluid in the rib configuration to displace molten material therein and to thereby form a hollow channel therein;

cooling the container part being molded;

removing the molded container part from the mold cavity;

cutting through the hollow channel at two spaced locations to form inlet and outlet openings to the channel to thereby enable circulation of a fluid therethrough.

The fluid that is injected may be a gas or a liquid. In the case of a gas, venting is required prior to removing the container from the mold cavity. If a liquid is used, pressure release may or may not be required depending on the liquid and procedure used.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

DESCRIPTION OF PREFERRED EMBODIMENTS

Figure 1:
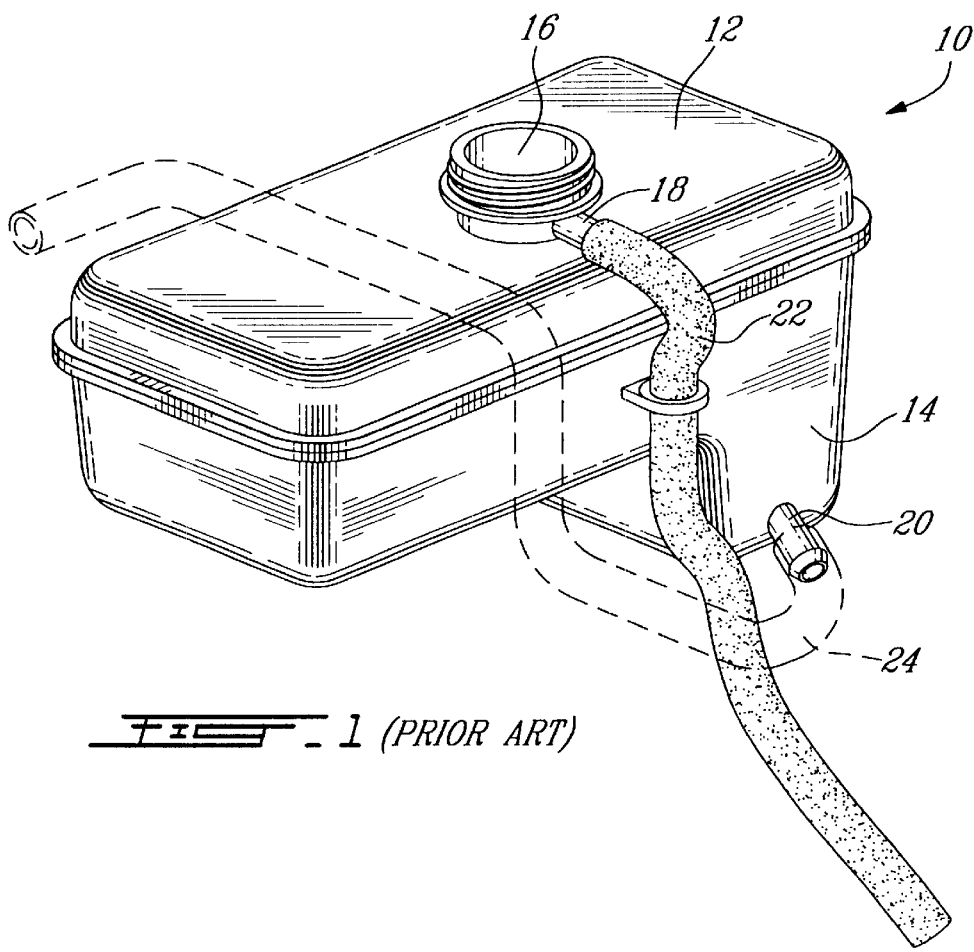
FIG. 1 is a perspective view of a plastic container of the prior art with tubes connected thereto.

Referring to FIG. 1, there is shown a conventional tank, generally denoted 10, formed of two molded parts 12 and 14 sealed to one another by known techniques. The upper component has a spout 16 to receive a fluid, such as a coolant as used in the automotive industry, a first port 18 and a second port 20. To these ports are connected tubes or hoses 22 and 24 which increase the space volume needed by the container once installed under the hood of a vehicle.

Figure 2:
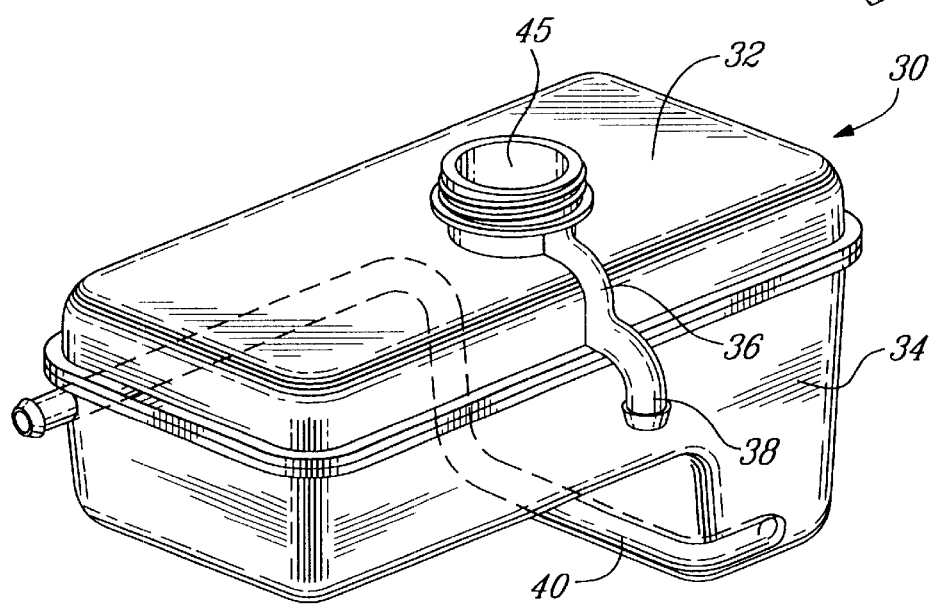
FIG. 2 is a perspective view of a plastic container made in accordance with the present invention.

The present invention is concerned with reducing this space volume and this is achieved by making a container, such as the one illustrated as 30 in FIG. 2, which includes also two parts 32 and 34 formed of a thermoplastic material by means of the injection molding technique. As a result of the present invention, a portion of the hoses 22 and 24 of the container of FIG. 1 are now integral parts of the container components 32 and 34. The upper molded part 32 has a rib portion 36 which is integral with its outer wall as well as a port portion 38 extending outwardly of the wall. The lower molded part 34 has a rib portion 40 which is integral with its outer wall, and on more than one face thereof.

Figure 3:
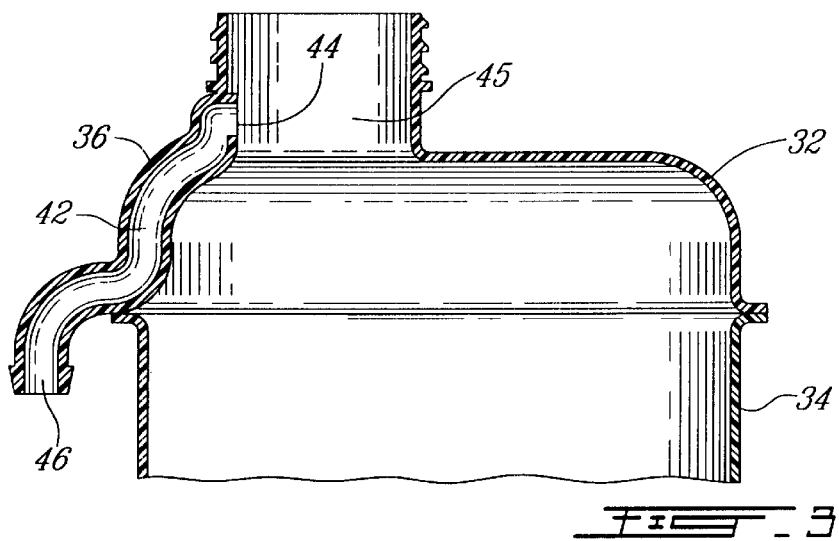
FIG. 3 is a cross-sectional view of the upper part of the container.

As can be seen in FIG. 3, the rib portion 36 defines a hollow channel 42 having a first orifice 44 opening in the fluid inlet 45 and a second orifice 46 at the extremity of the port portion 38.

Figure 4:
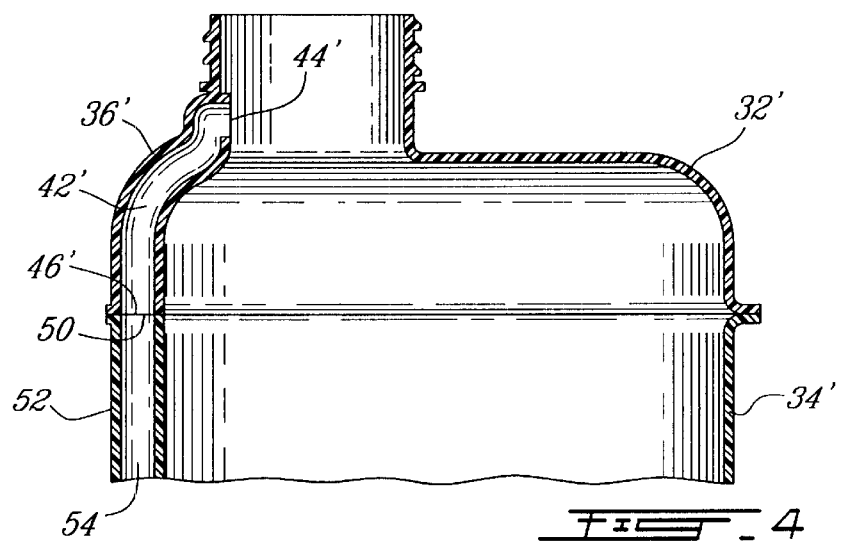
FIG. 4 is a cross-sectional view similar to FIG. 3 showing another embodiment of the present invention.

FIG. 4 illustrates another variant of a plastic container made in accordance with the present invention wherein the upper molded part 32' has a rib portion 36' defining a channel 42' and a first orifice 44' and a second orifice 46'. In this embodiment, the orifice 46' is contiguous with an orifice 50 of a rib portion 52 having a channel 54 (the opposite orifice not being shown) of the lower molded part 34'. Once parts 32' and 34' are sealingly assembled to one another, the orifices 46' and 50 continue the channel formed by channels 42' and 54.

Figure 5:
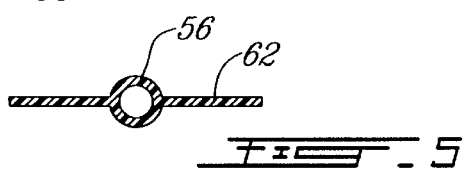
FIGS. 5, 6 and 7 represent various configurations of the location of the channel of a container wall.
Figure 6:
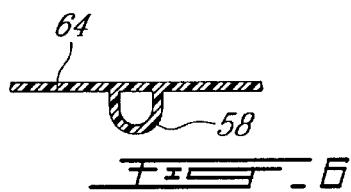
Figure 7:
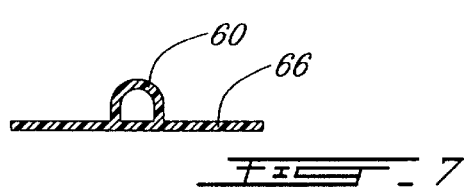

Referring to FIGS. 5, 6 and 7, it can be seen that the rib portions may be formed directly in the plane of a container wall 62 shown in FIG. 5 as rib 56 or internally of a wall 64 such as shown in FIG. 6 as rib 58 or externally of a wall 66 such as shown in FIG. 7 as rib 60, or a combination thereof.

It should be noted that, although the figures of the drawings make reference to a container particularly useful for the cooling system of an automotive vehicle, the present invention is directed to all types of plastic containers wherein the channel for the circulation of a fluid is useful for the content of the container; for example, one wherein a channel containing a cooling or heating material would coil around the container for circulating a cooling fluid for the material inside the container.

Figure 8:
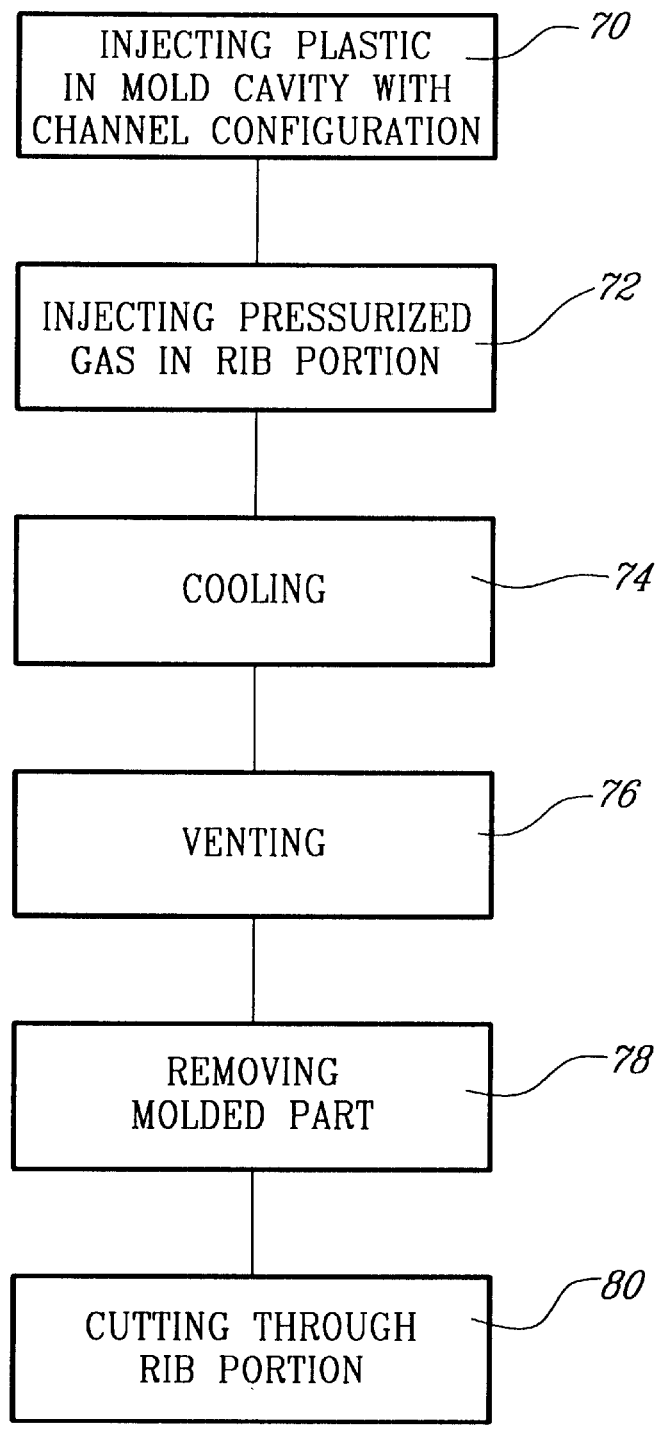
FIG. 8 is a block diagram representing the various steps of the method of the present invention when using a gas.

FIG. 8 is a flow chart of the successive steps involved in practicing one embodiment of the method of the present invention.

In step 70, a quantity of molten plastic is injected from an injection molding machine into a mold cavity. The plastic is any thermoplastic material with sufficient quantity to provide the mass of the part to be molded. The mold cavity has a channel configuration determined by the channel configuration that it is wished to be given to the molded part once finished. Once the plastic is injected, the channel configuration forms a rib portion in or on the wall of the molded part.

In step 72, a charge of pressurized gas is introduced into the mold once the injection of the molded plastic is substantially completed. This gas flow is maintained in sufficient time and amount to displace a controlled quantity of molten plastic material in the rib configuration where the plastic material is in a more viscous condition than in the remaining portion of the container walls. Hence, the hottest fluid plastic material is displaced by the gas thus providing a hollow interior to form the channel described above.

In step 74, the molten part is permitted to cooling to thereby solidify the material; however, the gas pressure is maintained.

In step 76, the gas is vented.

In step 78, the molded part is removed from the mold.

In step 80, there are two cutting operations performed on the plastic part thus formed and, more particularly, at two spaced locations of the rib portion thereby allowing two orifices to be made to the channel formed in the container wall. Hence, referring to FIG. 3, these orifices are at 44 and 46.

Figure 9:
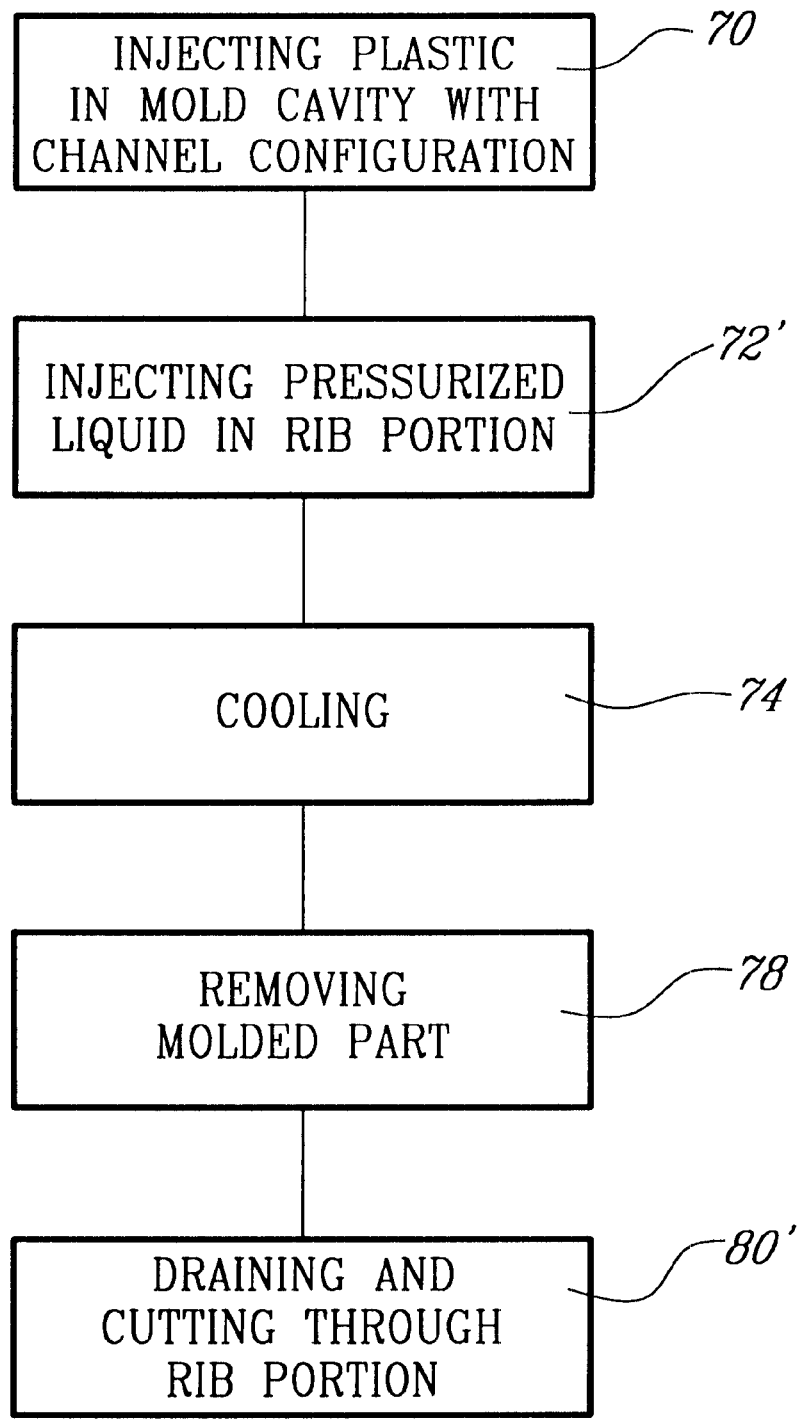
FIGS. 9 and 10 are block diagrams of the method when using a liquid.
Figure 10:
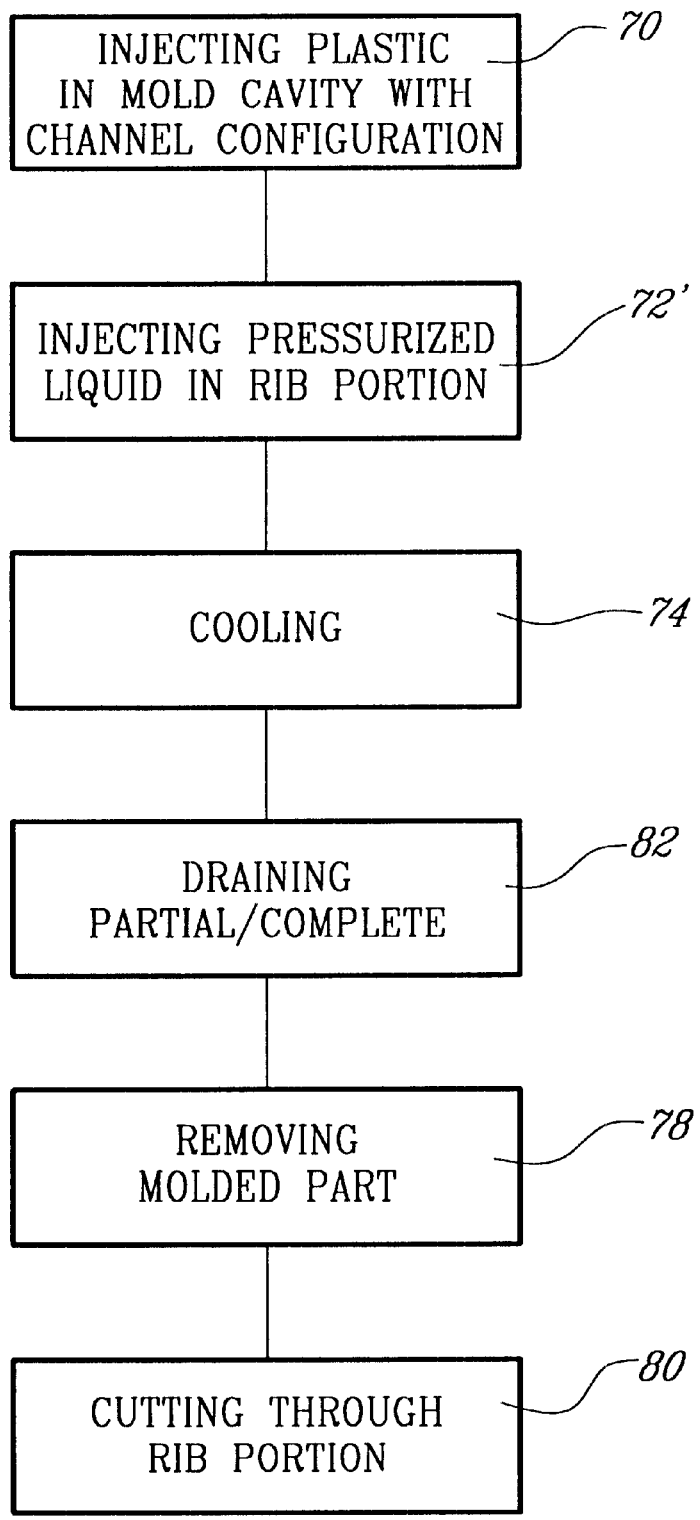

FIGS. 9 and 10 show the steps which may be performed if a liquid is used instead of a gas to make the channel in the walls of the container. Reference 72' is used to show that liquid instead of a gas is used. In FIG. 9, the molded part is removed (step 78) after cooling (step 74) and draining is performed as the cutting step 80' either before or after cutting. In FIG. 10, the draining step 82 is performed after the cooling step 74.

It should be noted that there are many variations of channel configurations that may be given to a container. For example, a channel may have a first orifice inside the container (as in FIG. 7), then have the channel extend through the wall (as in FIG. 5) and have second orifice on the outside face of the container wall (such as in FIG. 6).

Although the invention has been described above with respect with one specific form, it will be evident to a person skilled in the art that it may be modified and refined in various ways. It is therefore wished to have it understood that the present invention should not be limited in scope, except by the terms of the following claims.

What is claimed is:

1. A method of making a container part having walls comprising the steps of:
   injecting a molten thermoplastic material in a mold cavity having a channel configuration to define a rib portion in the walls of said container being molded;
   injecting a pressurized gas in said rib portion to displace molten material so as to form a hollow channel in said container part being molded;
   cooling the container part being molded while maintaining gas pressure;
   venting said gas;
   removing the molded container part;
   cutting through said rib portion at two spaced locations to form inlet and outlet openings to said hollow channel to thereby enable circulation of a fluid through said channel.

2. A method as defined in claim 1, wherein pressure during said gas injection is maintained to ensure the displaced plastic material of said hollow channel to flow into a spill reservoir.

3. A method as defined in claim 1, comprising the step of delaying the gas injection to ensure full compaction of the plastic material injected.

4. A method of making fluid receiving containers having walls with fluid circulatable channels integrally formed to said container walls, comprising the steps of:
   injecting a molten thermoplastic material in a mold cavity having a channel configuration to define a rib portion in the walls of a container part to be molded;
   injecting a pressurized gas in said rib portion to displace molten material so as to form a hollow channel in said container part being molded;
   cooling the container part being molded while maintaining gas pressure;
   venting said gas;
   removing the molded container part;
   cutting through said rib portion at two spaced locations to form inlet and outlet openings to said hollow channel, said locations being internal and external of said container to thereby enable circulation of a fluid through said channel in and out of said container.

5. A method of making a container formed of two molded container parts, each molded container part being formed by injecting a molten thermoplastic material in a mold cavity, at least one of the mold cavities having a channel configuration to define a rib portion in the walls of the container part being molded;
   injecting a pressurized gas in said rib portion to displace molten material so as to form a hollow channel in said container part being molded;
   cooling the container part being molded while maintaining gas pressure;
   venting said gas;
   removing the molded container part;
   cutting through said rib portion at two spaced locations to form inlet and outlet openings to said hollow channel to thereby enable circulation of a fluid through said channel;
   sealing said two molded container parts together to form an enclosed container.

6. A method as defined in claim 5, wherein a second of said molded container parts is formed by injecting a molten thermoplastic material in a second mold cavity having a channel configuration to define a rib portion in the walls of the container being molded;

injecting a molten thermoplastic material in a mold cavity having a channel configuration to define a rib portion in the walls of said second container part being molded;

injecting a pressurized gas in said rib portion to displace molten material so as to form a hollow channel in said second container part being molded;

cooling the second container part being molded while maintaining gas pressure;

venting said gas;

removing the second molded container part;

cutting through said rib portion at two spaced locations to form inlet and outlet openings to said hollow channel to thereby enable circulation of a fluid through said channel.

7. A method as defined in claim 6, wherein said molded container parts are placed together so as to align the channel of each molded part so that once the container parts are sealed there is a continuous fluid circulation possible between the channels of each molded part.

8. A method of making containers having walls comprising the steps of:

injecting a molten thermoplastic material in a mold cavity having a channel configuration to define a rib portion in the walls of the container being molded;

injecting a pressurized fluid in said rib portion to displace molten material so as to form a hollow channel in said container being molded;

cooling the container being molded;

removing the molded container from the mold cavity;

cutting through said rib portion at two spaced locations to form inlet and outlet openings to said hollow channel to thereby enable circulation of a fluid through said channel.

9. A method of making a container part having walls with fluid circulatable channels integrally formed to said container walls, comprising the steps of:

injecting a molten thermoplastic material in a mold cavity having a channel configuration to define a rib portion in the walls of the container part being molded;

injecting a pressurized liquid in said rib portion to displace molten material so as to form a hollow channel in said container part being molded;

cooling the container part being molded;

draining said liquid;

removing the molded container part;

cutting through said rib portion at two spaced locations to form inlet and outlet openings to said hollow channel, said locations being internal and external of said container part to thereby enable circulation of a fluid through said channel.

10. A method of making a container part having walls comprising the steps of:

injecting a molten thermoplastic material in a mold cavity having a channel configuration to define a rib portion in the walls of the container part being molded;

injecting a pressurized liquid in said rib portion to displace molten material so as to form a hollow channel in said container part being molded;

cooling the container part being molded;

removing the molded container part;

draining and cutting through said rib portion at two spaced locations to form inlet and outlet openings to said hollow channel to thereby enable circulation of a fluid through said channel.

\* \* \* \* \*